United States Patent [19]
Bonnema et al.

[11] 3,884,644
[45] May 20, 1975

[54] PROCESS FOR RECOVERING AMMONIUM SULPHATE FROM AQUEOUS SOLUTIONS OF AMMONIUM SULPHATE CONTAINING ORGANIC CONSTITUENTS AND HEAVY METAL IONS

[75] Inventors: Jentje Bonnema, Beek; Henri J. H. Simon, Geleen, both of Netherlands

[73] Assignee: Stamicarbon B.V., Geleen, Netherlands

[22] Filed: Jan. 3, 1973

[21] Appl. No.: 320,765

Related U.S. Application Data

[63] Continuation of Ser. No. 72,788, Sept. 16, 1970, abandoned, which is a continuation-in-part of Ser. No. 798,155, Feb. 10, 1969, abandoned.

[52] U.S. Cl. ............... 23/299; 23/300; 23/302; 423/54; 423/139; 423/24; 423/545; 423/658.5
[51] Int. Cl. ................ B01d 9/02; C01c 1/24
[58] Field of Search ........... 23/299, 300, 302, 296, 23/297; 423/54, 139, 24, 545, 546, 658.5

[56] References Cited
UNITED STATES PATENTS

| 2,226,101 | 12/1940 | Ogden | 23/302 A |
|---|---|---|---|
| 2,874,028 | 2/1959 | Ponchaud | 23/302 |
| 3,324,180 | 6/1967 | Beer | 23/302 |
| 3,366,681 | 1/1968 | Thoma | 23/302 |
| 3,489,512 | 1/1970 | Okuno | 23/302 |
| 3,549,706 | 12/1970 | Takaki | 23/302 |
| 3,576,607 | 4/1971 | Guthmann | 23/302 |
| 3,607,136 | 9/1971 | Smiley | 23/302 |
| 3,709,666 | 1/1973 | Westosveld | 23/302 |

FOREIGN PATENTS OR APPLICATIONS

| 699,239 | 12/1964 | Canada | 23/312 R |
|---|---|---|---|
| 1,206,505 | 9/1970 | United Kingdom | 23/302 A |
| 485,164 | 5/1938 | United Kingdom | 23/302 A |
| 41-13466 | 7/1966 | Japan | 23/302 A |

OTHER PUBLICATIONS

"Versene Regular," Key to Chelation (The Verseuer), Tech. Bull., No. 2, Berswerth Chem. Co., Feb. 1954, PP. 5, 16A, 16C, 16B.
The Merck Index, 7th Ed., 1960, page 385.

*Primary Examiner*—A. Louis Monacell
*Assistant Examiner*—S. J. Emery
*Attorney, Agent, or Firm*—Cushman, Darby & Cushman

[57] ABSTRACT

An improvement in a process for recovering ammonium sulfate from a contaminated, aqueous ammonium sulfate solution containing both tarry organic and heavy contaminants (e.g., from Group VIII of the Periodic Table) is disclosed wherein a compound, or several compounds, which can form complexes together with said metal ions, and the solution is then treated with one, or several, water-soluble organic substances which, at least in combination with a saturated ammonium sulfate solution, are capable of forming a two-layer liquid phase system therewith. The resultant two layers may be separated into an aqueous phase containing purified ammmonium sulfate and an organic phase containing the organic substance, organic contaminants and metallic contaminants. The ammonium sulfate can be recovered as water-white, cubical crystals.

5 Claims, No Drawings

PROCESS FOR RECOVERING AMMONIUM SULPHATE FROM AQUEOUS SOLUTIONS OF AMMONIUM SULPHATE CONTAINING ORGANIC CONSTITUENTS AND HEAVY METAL IONS

CROSS-REFERENCE TO RELATED APPLICATIONS

This application is a continuation from earlier application Ser. No. 72,788 filed Sept. 16, 1970, now abandoned, which in turn is a continuation-in-part of our earlier application Ser. No. 798,155 filed Feb. 10, 1969, now abandoned, in favor of our co-pending continuation application Ser. No. 161,997 filed July 12, 1971.

BACKGROUND OF THE INVENTION

The present invention relates to an improvement in the process of recovering ammonium sulfate from organic contaminated aqueous solutions formed in the sythesis of organic compounds as described in the copending application Ser. No. 798,155, filed Feb. 10, 1969.

Aqueous ammonium sulfate solutions are obtained as waste by-product of several processes used in producing various organic compounds e.g., the process for preparing acrylonitrile by oxidation of gaseous propylene in the presence of ammonia, preparing methylmethacrylate from acetone cyanohydride, methanol and sulfuric acid and preparing methylacrylate from acrylonitrile, methanol and sulfuric acid. These solutions are normally contaminated with tarry, organic substances. These tarry substances resist the action of known conventional extraction agents, such as acetone, benzene, ethyl alcohol, carbon tetrachloride, dichloroethylene, cyclohexane, cyclohexanone, methyl isobutylketone and are, thus, difficult to remove from the aqueous solutions.

In copending application Ser. No. 798,155 there is disclosed a method for recovering the ammonium sulfate by subjecting the contaminated aqueous ammonium sulfate solution to the action of a very active extraction agent. The extraction agent comprises an organic substance which is water soluble and which is capable, in combination with a saturated ammonium sulfate, of forming a two-layer system. Examples of such organic substances are dioxan, dimethyl formamide, acetonitrile and lactams i.e., piperidone, pyrrolidone and, in particular, caprolactam. The latter substance is relatively nonvolitile at elevated temperatures and can be easily recovered in the pure state by extraction with benzene.

The ammonium sulfate solution is subjected to an extraction with the aqueous solution of the water-soluble organic substance. The organic contaminants are transferred to the aqueous solution containing the dissolved organic substance and decanted from the phase containing the ammonium sulfate. The ammonium sulfate can then be crystallized from the phase in which it is dissolved. The quantity of water-soluble organic substance to be added depends on the working conditions; for example, in the case of a 30% ammonium sulfate solution, 50% by weight of caprolactam, calculated to the amount of ammonium sulfate, is added in the form of an aqueous solution of 75% concentration. As reported in the above-mentioned copending application Ser. No. 798,155, the amount of water soluble organic substance is within the range of about 20 to 200% by weight, based on the weight of ammonium sulfate and preferably between about 25 to 100%.

The process of the above-mentioned copending application Ser. No. 798,155 can also be effected by crystallizing the ammonium sulfate in the solution in the presence of one or more of the above-mentioned organic substances, instead of subjecting the solution to the extraction treatment. During the crystallization, the organic contaminants are transferred to the phase containing the organic substance and the crystallized ammonium sulfate recovered.

If the contaminated solution contains metal ion contaminants as well as the organic contaminations, for example iron ions, crystallization does not yield the ammonium sulfate in a desirable crystal form, even though the organic impurities have been removed. The crystals of ammonium sulfate obtained are needle-shaped and create difficulties in transport as the needles tend to form a tangled mass. Moreover, the crystals have an undesirable green color.

DETAILED DESCRIPTION OF THE INVENTION

It has now been found that if the contaminated ammonium sulfate solution, containing both the tarry organic impurities and soluble heavy metal ions, is first treated with a reagent which forms a Werner complex ion with said heavy metal ions, the subsequent extraction technique described herein, and in the aforementioned copending application is effective to remove both the tarry and the metallic impurities.

The improved results of this invention are thus achieved by adding to the contaminated ammonium sulfate solution, prior to the treatment thereof with the organic substances, a compound, or several compounds, which will form a Werner complex with the metal ions present in the solution. It has been found that the metal complexes thus formed in the solution can then be very readily removed along with the organic contaminations by means of the extraction or crystallization process using the above-mentioned water-soluble organic extraction agents. The use of an extractant as taught in the copending application Ser. No. 798,155, and in particular caprolactam, is an essential feature of the present invention and the entire contents of the above-mentioned copending application Ser. No. 798,155 is incorporated herein by reference. Suitable extractants include dioxan, dimethyl formamide, acetonitrile and lactams of 4 to 20 carbon atoms such as caprolactam.

According to the present invention substantially colorless ammonium sulfate of cubic crystal form is recovered from an ammonium sulfate solution contaminated with tarry organic products and ferric, chromium or nickel ions, by adding to said solution a substance such as acetic acid, a thiocyanate, nitrilotriacetic acid or ethylenediamine tetraacetic acid, in a quantity as least about stoichiometrically equal to the quantity of the metal ion contaminants, as the complex-building agent. The contaminated solution is preferably treated for some period of time with at least one of these substances at an elevated temperature (e.g., between about 50° to 100°C.) prior to the extraction or crystallization process utilizing the water-soluble organic extractants.

If ferrous ions are present, $\alpha,\alpha'$-dipyridyl may be employed as the complex-forming agent.

The invention is not limited to the use of the complex-forming agents mentioned above; any of the several type of Werner complex-forming organic substance known to the art may be employed, according to their ability to complex the contaminating metal ions. Iron is the most usual contaminant; other, like chromium, nickel and copper, can be suitably handled with the complex-forming substances mentioned above.

While the use of complex-building agents for the purification of chemicals by means of crystallization processes is well known, according to the prior teachings the complex formed remains soluble in the mother liquor during the crystallization of the salt, and from which the crystals are removed. This approach has the disadvantage, in the case of continuous crystallization, that the concentration of the undesirable metal ions in the mother liquor steadily increases.

In the process according to the present invention, by contrast there is no such disadvantage because, prior to the crystallization, the metal ions are removed from the aqueous ammonium sulfate solution by extraction with the aqueous solution by the above-mentioned water-soluble organic substance.

The process of the invention may also be employed in the case of continuous crystallization of ammonium sulfate from contaminated solutions, in which the metal ions and other organic contaminants are discharged in the liquid phase containing the water soluble organic agents mentioned above, and are, therefore, not left in the mother liquor.

The invention will now be elucidated with the aid of comparitive examples.

EXAMPLE I

A contaminated solution of ammonium sulfate (1 kg, containing 387 g of ammonium sulfate, 19 g of organic impurities, 662 g of water and 1.6 g of ferric, chromium and nickel ions) was heated for one half hour at 90°C after addition of 1 g of nitrilotriacetic acid. This solution was then supplied at a rate of 1 kg per hour to the top of an extraction column, while 200 grams per hour of an aqueous caprolactam solution (containing 750 g of caprolactam per 1 kg of solution) was fed in at the base. The contaminated solution of ammonium sulfate was thereby subjected to extraction with the caprolactam solution passing in counterflow relationship, with the result that 225 grams per hour of contaminated caprolactam solution were drawn off at the top, and 975 grams per hour of purified ammonium sulfate solution issued from the column base.

The purified ammonium sulfate solution contained 380 g of ammonium sulfate, 0.3 g of organic impurities, 0.025 g of metal ions and 7 g of caprolactam per kg of solution. Upon removal of this caprolactam portion by extraction with benzene, the remaining aqueous ammonium sulfate solution was subjected to a normal crystallization process, which yielded water-white ammonium sulfate cubic crystals. After extraction with the caprolactam solution only 0.0025 of the metal ions previously present was left in the ammonium sulfate solution.

The caprolactam contained in the contaminated caprolactam solution was recovered by extraction with benzene. The caprolactam can also be receovered by distillation.

EXAMPLE II

Test A

A contaminated solution (containing 350 g of ammonium sulfate, 20 g of organic impurities and 1.5 g of ferric, chromium and nickel ions per 1 kg of solution) was introduced into a crystallizer at the rate of 300 grams per hour. The ammonium sulfate was crystallized by removing 629 grams per hour of water by distillation under a reduced pressure at a temperature of 60°C.

The crystallized ammonium sulfate was then removed from the crystallizer at set intervals, the yield being 110 grams per hour. Said salt consisted of highly contaminated needle-like acicular ammonium sulfate crystals. The acicular crystals caused difficulties during transport and caused blockages, because large quantities of the needles tended to form a tangled mass. The contaminates were organic products, which separated out as sticky, tarry, sulfate crystals, thereby further impeding the crystal growth. The crystallizer was also fouled by the tarry material to such an extent that the crystallizer had to be cleaned at set intervals.

Test B

To a contaminated ammonium sulfate solution (containing 324 g of ammonium sulfate, 25 g of organic impurities and 1.7 g of ferric, chromium and nickel ions per 1 kg of solution) 8 g of caprolactam were added per 1 kg of such solution. This solution was fed at a rate of 300 grams per hour to the crystallizer mentioned in test A. No tarry mass formed in the crystallizer, but an "oil" of lower specific gravity than the mother liquor in the crystallizer separated out during crystallization of the ammonium sulfate. The "oil" did not adhere to the ammonium sulfate crystals and was removed from the crystallizer via a liquid separator.

The quantity of "oil" removed was 12.5 grams per hour and the yield of ammonium sulfate 97 grams per hour. The quantity of organic contaminations in the dry salt was less than 0.5 g/kg. The ammonium sulfate crystals consisted of light-green needles, which still caused blockage during transport. The quantity of metal ions in the dry salt was 1 g per kg of salt.

Test C

A contaminated ammonium sulfate solution (containing 320 g of ammonium sulfate, 23 g of organic impurities and 1.8 g of ferric, chromium and nickel ions per 1 kg of solution), at a pH of 3, heated at 90°C for half an hour after addition of one gram of ethylenediamine tetraacetic acid per 1 kg of solution. The ammonium sulfate solution treated with this complex-forming substance was fed at a rate of 300 grams per hour to the crystallizer of test A after addition of 10 g of caprolactam per kg of solution. Via a liquid separator, 13 grams per hour of oil were drained from the crystallizer. The oil contained 3.9% by weight of metal ions, so that virtually all metal ions were separated out together with the oil. The yield of ammonium sulfate amounted to 95 grams per hour, the crystals having the desired cubic shape and a white color. Difficulties during transport were absent. Neither the crystals nor the mother liquor contain any of the above-mentioned metals in more than trace quantities.

EXAMPLE III

The experiment of example I was carried out in the presence of 1.5 g of ferrous ions; one gram of α,α'-dipyridyl was added as the complex-forming agent. The salt crystals obtained in this experiment also showed the desired cubic shape and a white color.

What is claimed is:

1. An improved process for recovering ammonium sulfate from an impure solution thereof obtained from the synthesis of organic compounds, said aqueous solution containing ammonium sulfate and tarry organic constituents and at least one heavy metal ion selected from the group consisting of ferrous, ferric, chromium, nickel, copper and mixtures thereof, said organic compounds selected from the group consisting of:
   a. acrylonitrile prepared by oxidation of gaseous propylene in the presence of ammonia wherein the reaction product is treated with sulfuric acid and then separated from the resulting ammonium sulfate solution;
   b. methyl methacrylate prepared from acetone, cyanohydrin, methanol and sulfuric acid; and
   c. methacrylate prepared from acrylonitrile, methanol and sulfuric acid;
   the improvement which consists in first adding to said ammonium sulfate solution, a water-soluble Werner complex forming compound with the heavy metal ions contained in said solution, said compound being selected from the group consisting of acetic acid, nitroliotriacetic acid and α,α'-dipyridyl, and thereafter treating said solution with a water soluble organic substance selected from the group consisting of dioxan, dimethyl formamide, acetonitrile, lactams containing 4 to 20 carbon atoms and mixtures thereof,
   said water-soluble organic substance being one which, at least in combination with a saturated aqueous ammonium sulfate solution, is capable of forming a two layer liquid phase system, wherein the said tarry organic constituents and the said heavy metal ions in Werner complexed form are both extracted into one of said layers and the other of said layers contains an aqueous solution of purified ammonium sulfate,
   thereafter separating said ammonium sulfate solution layer, and
   crystallizing therefrom purified substantially water-white, cubical ammonium sulfate crystals.

2. The process according to claim 1 wherein said Werner complex forming compound is selected from the group consisting of acetic acid, and nitroliotriacetic acid.

3. The process according to claim 1 wherein said Werner complex forming compound is α,α'-dipyridyl.

4. An improved process for recovering substantially colorless cubical ammonium sulfate crystals from an ammonium sulfate solution contaminated with tarry organic constituents and ferrous ions, said organic compounds selected from the group consisting of:
   a. acrylonitrile prepared by oxidation of gaseous propylene in the presence of ammonia wherein the reaction product is treated with sulfuric acid and then separated from the resulting ammonium sulfate solution;
   b. methyl methacrylate prepared from acetone, cyanohydrin, methanol and sulfuric acid; and
   c. methacrylate prepared from acrylonitrile, methanol and sulfuric acid; comprising the steps of:
      1. adding to said contaminated solution with α,α'-dipyridyl to effect a Werner complex with the ferrous ions;
      2. contacting the solution obtained in step 1 with at least one water-soluble extracting agent for the tarry organic constituents, said agent selected from the group consisting of dioxan, dimethyl formamide, acetonitrile, lactams of 4 to 20 carbon atoms and mixtures thereof, for a period of time sufficient to effect the formation of a two-layer liquid system, one layer being aqueous solution containing a mixture of said Werner complex, said extracting agent and said tarry organic constituents, and the other layer being aqueous solution containing the ammonium sulfate;
      3. separating said aqueous solution layer containing ammonium sulfate; and,
      4. crystallizing and recovering from the said solution obtained in step 3 pure, substantially water-white cubical ammonium sulfate crystals.

5. The process of claim 4 wherein the extracting agent is caprolactam.

* * * * *

UNITED STATES PATENT OFFICE
CERTIFICATE OF CORRECTION

Patent No. 3,884,644　　　　　　　　　　Dated May 20, 1975

Inventor(s) Jentje Bonnema et al.

It is certified that error appears in the above-identified patent and that said Letters Patent are hereby corrected as shown below:

On the Title Page, the following should be added:

-- [30]　Foreign Application Priority Data
　　　Sept. 16, 1969　　Dutch　----------6914015 --.

Signed and Sealed this

*twenty-fifth* Day of *November 1975*

[SEAL]

Attest:

RUTH C. MASON
*Attesting Officer*

C. MARSHALL DANN
*Commissioner of Patents and Trademarks*